United States Patent
Sugitani et al.

(10) Patent No.: US 6,840,346 B2
(45) Date of Patent: Jan. 11, 2005

(54) STEERING APPARATUS FOR A VEHICLE

(75) Inventors: Nobuo Sugitani, Wako (JP); Osamu Tsurumiya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/453,188

(22) Filed: Jun. 2, 2003

(65) Prior Publication Data
US 2004/0003954 A1 Jan. 8, 2004

(30) Foreign Application Priority Data

Jul. 8, 2002 (JP) .................................. 2002-198342

(51) Int. Cl.[7] .................................................. B62D 5/04
(52) U.S. Cl. ........................................ 180/402; 701/41
(58) Field of Search ............................... 180/402, 403, 180/444, 443, 446; 701/41, 42, 43

(56) References Cited

U.S. PATENT DOCUMENTS 5,908,457 A * 6/1999 Higashira et al. ............. 701/41
6,079,513 A * 6/2000 Nishizaki et al. ............ 180/402
6,082,482 A * 7/2000 Kato et al. ................... 180/402
6,523,637 B1 * 2/2003 Nakano et al. ............... 180/402

FOREIGN PATENT DOCUMENTS

| JP | 9-301193 | 11/1997 |
| JP | 10-217998 | 8/1998 |

* cited by examiner

Primary Examiner—Avraham Lerner
(74) Attorney, Agent, or Firm—Merchant & Gould P.C.

(57) ABSTRACT

A steering apparatus for a vehicle is provided, which has a controller, a first device for detection of an amount of manipulation rendered to the controller, a second device for detection of an amount of steering of steerable wheels, a control unit for controlling an amount of steering based on at least the amount of manipulation and a third device for applying a reaction force to the controller. The apparatus has a feature that it includes the sensor for detection of a speed of the vehicle and the control unit determines the reaction force by multiplying a deviation between the amount of manipulation and the amount of steering by a coefficient for vehicle speed, which is adapted to be larger as the speed of the vehicle detected by the sensor increases.

6 Claims, 13 Drawing Sheets

STEERING APPARATUS FOR A VEHICLE

FIELD OF THE INVENTION

The present invention relates to an apparatus which a driver manipulates to steer the steerable wheels of a vehicle.

BACKGROUND OF THE INVENTION

An apparatus for steering the steerable wheels of a vehicle has been known, which employs a steering wheel. The apparatus converts the rotational motion of steering wheel into the linear motion of a rack shaft situated in a steering gearbox, thus driving a link mechanism coupled with the rack shaft to steer the steerable wheels.

Recently, a steer-by-wire system has been reported, which mechanically separates a steering shaft connected to a steering wheel from a steering mechanism to steer the steerable wheels and instead electrically controls via a control unit a steering motor disposed in a steering apparatus. A steering apparatus of steer-by-wire (hereinafter referred to as a steering apparatus) basically has a steering motor to steer steerable wheels and a sensor for detection of an amount of manipulation of a steering wheel. The steering apparatus controls the steering motor according to the amount detected by the sensor, thereby conveying the manipulation of steering wheel made by a driver to the steerable wheels.

In a steering apparatus of steer-by-wire, since a steering shaft connected to a steering wheel is mechanically separated from steerable wheels, a reaction force acting on the steerable wheels is not conveyed to the steering wheel and thereby a driver experiences difficulty in grasping the conditions of a road surface and the steerable wheels. A steering control apparatus disclosed in Japanese Published Patent Application 10-217998 employs steering reaction force to solve the problem described above. The steering reaction force is generated based on a deviation between an amount of control target corresponding to the steered angle of a steering wheel and an amount of steering representative of an actual amount of displacement of the steering shaft, and in addition based on a speed of change of the deviation. This approach allows a driver to feel a reaction force, which is correlated with a discrepancy between an amount of manipulation of a steering wheel and an actual amount of steering of steerable wheels.

A steer-by wire system, which is able to separate steerable wheels from a controller mechanically, can provide better flexibility for the controller design. A steering apparatus, which uses a joy stick instead of a steering wheel in order to steer the steerable wheels of a vehicle, has also been proposed. Japanese Published Patent Application 9-301193 discloses an example for such a type of steering apparatus.

However, a conventional steering apparatus of steer-by-wire, which generates a reaction force independent of vehicle speed, applies a smaller reaction force to a controller than that applied to a steering wheel during vehicular travel at high speeds, thereby still posing a problem of unstable steering (manipulation of a controller). On the other hand, if a reaction force is adapted to be desirable for a vehicle traveling at high speeds in order to improve the stability of a vehicle, it will pose another problem that heavier feeling in manipulating a controller during vehicular travel at low speeds results in less comfortable steering.

When a force exerted by a road surface on the steerable wheels of a vehicle is conveyed to a controller in the form of reaction force so that a driver can have understanding for the conditions of road surface, it may make him feel uncomfortable if all the forces are conveyed to the controller.

SUMMARY OF THE INVENTION

The object of the present invention is to provide a steering apparatus for a vehicle with a steer-by-wire system, in which the stability in terms of manipulation of a controller is improved.

The present invention provides a steering apparatus for a vehicle having a controller which a driver manipulates for steering, a first device for detection of an amount of manipulation rendered to the controller, a second device for detection of an amount of steering of steerable wheels, a control unit for controlling the amount of steering based on at least the amount of manipulation detected by the first device and a third device for applying a reaction force to the controller in a direction opposite to a direction of the manipulation according to a signal delivered by the control unit. The apparatus has a feature that it includes the sensor for detection of a speed of the vehicle and the control unit determines the reaction force by multiplying a deviation between the amount of manipulation and the amount of steering by a coefficient for vehicle speed, which is adapted to be larger as the speed of the vehicle detected by the sensor increases.

The apparatus described above has the control unit which is able to control the steerable wheels of a vehicle according to the difference between a position of controller equivalent to an amount of manipulation and an amount of steering of the steerable wheels as a result of manipulation of the controller. The control unit also multiplies the deviation by a coefficient for vehicle speed depending on a vehicle speed and thereby the device for reaction force applies a reaction force to the controller according to the product of multiplication.

As a result, when a vehicle travels at low speeds, a reaction force takes a small value, which acts on the controller in the opposite direction of manipulation of the controller. On the other hand, when the vehicle travels at high speeds, the reaction force takes a large value. In this way, sudden manipulation during vehicular travel at high speeds can be prevented without sacrificing comfortable steering feeling during vehicular travel at low speeds.

The present invention also provides a steering apparatus having a switch by which a driver can select a mode. The apparatus has a feature that the control unit determines a reaction force by introducing a coefficient for vehicle speed correlated with the mode selected by the driver with the switch.

In this way, the apparatus allows a driver to select a mode, thereby determining a coefficient for vehicle speed according to the mode. The device for reaction force applies a reaction force to the controller according to the product of a deviation and a coefficient for vehicle speed. The device is thus able to select a pattern of magnitude of reaction force acting on the controller depending on the mode selected by the driver. As a result, the device provides the driver with selection for the manipulation feeling of controller.

The present invention further provides an apparatus, in which the control unit determines a reaction force by multiplying a deviation by a coefficient for compensation of frequency, which is adapted to decrease in a high frequency range of the deviation.

The apparatus does a multiplication of a deviation and a coefficient for compensation of frequency, which is adapted to decrease in a high frequency range of the deviation, in determining a reaction force. In this way, deviations resulting from the fine shakes of steerable wheels due to an uneven road surface and other vibrations are not converted into reaction forces to be applied to the controller. This leads to an improvement of manipulation feeling of a driver.

The present invention still further provides a steering apparatus, in which a coefficient for compensation of frequency is adapted to take larger values in a medium frequency range than in a low frequency range.

The apparatus is thus able to apply a reaction force to the controller, prioritizing a medium frequency range of the deviation. In this way, the apparatus can apply a reaction force selectively to the controller for the medium frequency range, in which a driver performs sporty steering.

The present invention yet further provides a steering apparatus, further having a switch by which a driver can select a mode. The apparatus has a feature that a control unit determines a reaction force by introducing a coefficient for compensation of frequency correlated with the mode selected by the driver with the switch.

The apparatus described above is able to determine a coefficient for compensation of frequency depending on a mode, which the driver selects with the mode switch. The apparatus then applies a reaction force to a controller according to a product obtained by multiplying a deviation by a coefficient. In this way, the apparatus can change a pattern of magnitude of reaction force acting on the controller according to the mode selected by the driver, thereby selectively providing manipulation feeling to satisfy the preference of driver.

DESCRIPTION OF THE PREFERRED EMBODIMENTS

Embodiments according to the present invention are now described in detail referring to the accompanying drawings.

a. First Embodiment

Figure 1:
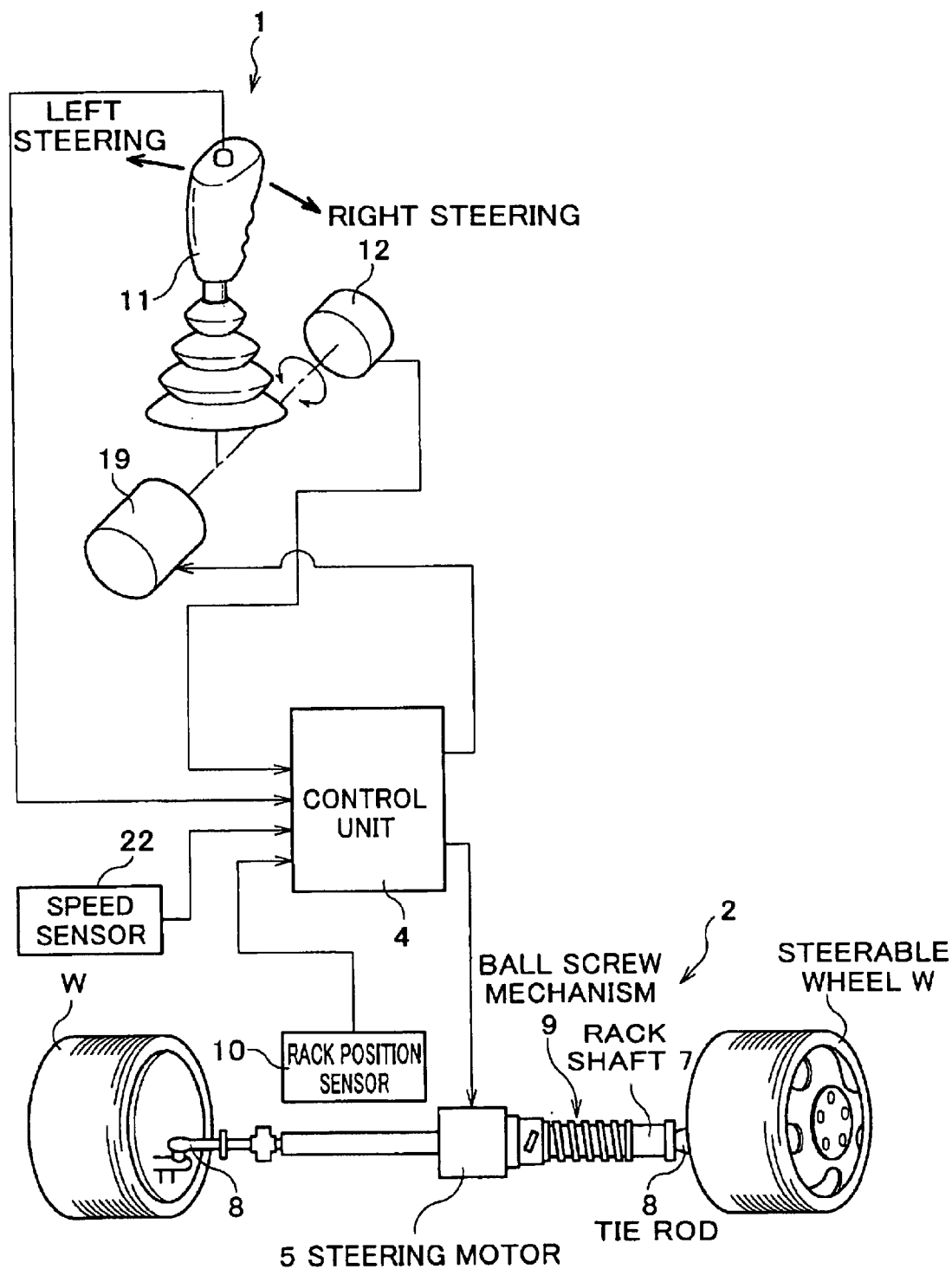
FIG. 1 is a figure showing the structure of a steering apparatus for a vehicle according to the present invention.

As shown in FIG. 1, a steering apparatus for a vehicle according to the first embodiment, in which a lever 11 is manipulated right or left, controls a steering mechanism 2 via a control unit 4. The steering mechanism 2, which drives a steering motor 5 with a signal delivered by the control unit 4, converts the motion of steering motor 5 into the linear motion of a rack shaft 7 with a ball screw mechanism 9, thereby steering steerable wheels W.

A controller 1 to be described later in detail includes the lever 11 manipulated by a driver, a device 12 for detection of an amount of manipulation rendered to the lever 11 and a device for applying a reaction force such as a reaction force motor 19 for applying a reaction force to the lever 11 according to a command given by the control unit 4.

The signal of an amount of manipulation detected by the device 12 enters the control unit 4.

A device for detection of an amount of steering of steerable wheels such as a rack position sensor 10 for detecting a position of the rack shaft 7 (hereinafter also referred to as a rack position) is mounted on the rack shaft 7. The signal of a rack position detected by the rack position sensor 10 enters the control unit 4. A linear encoder or a potentiometer mounted along the rack shaft 7 is used for the rack position sensor 10 and a combination of plural sensors may be an alternative. In the present embodiment, the detection of a rack position enables knowing the amount of steering of steerable wheels W.

A signal of the speed of a vehicle detected by a speed sensor 22, which is mounted on the vehicle, enters the control unit 4.

The steering motor 5, which is driven by a signal delivered by the control unit 4, is connected to a nut of the ball screw mechanism 9. On the other hand, the screw axis of ball screw mechanism 9 is aligned with the axis of rack shaft 7. In this way, the ball screw mechanism 9 converts the rotational motion of steering motor 5 to the linear motion of rack shaft 7. Tie rods 8, through which the rack shaft 7 is coupled to the steerable wheels W, converts the linear motion of rack shaft 7 to the steering motion of steerable wheels W.

Description is made below in detail for the controller 1.

Figure 2:
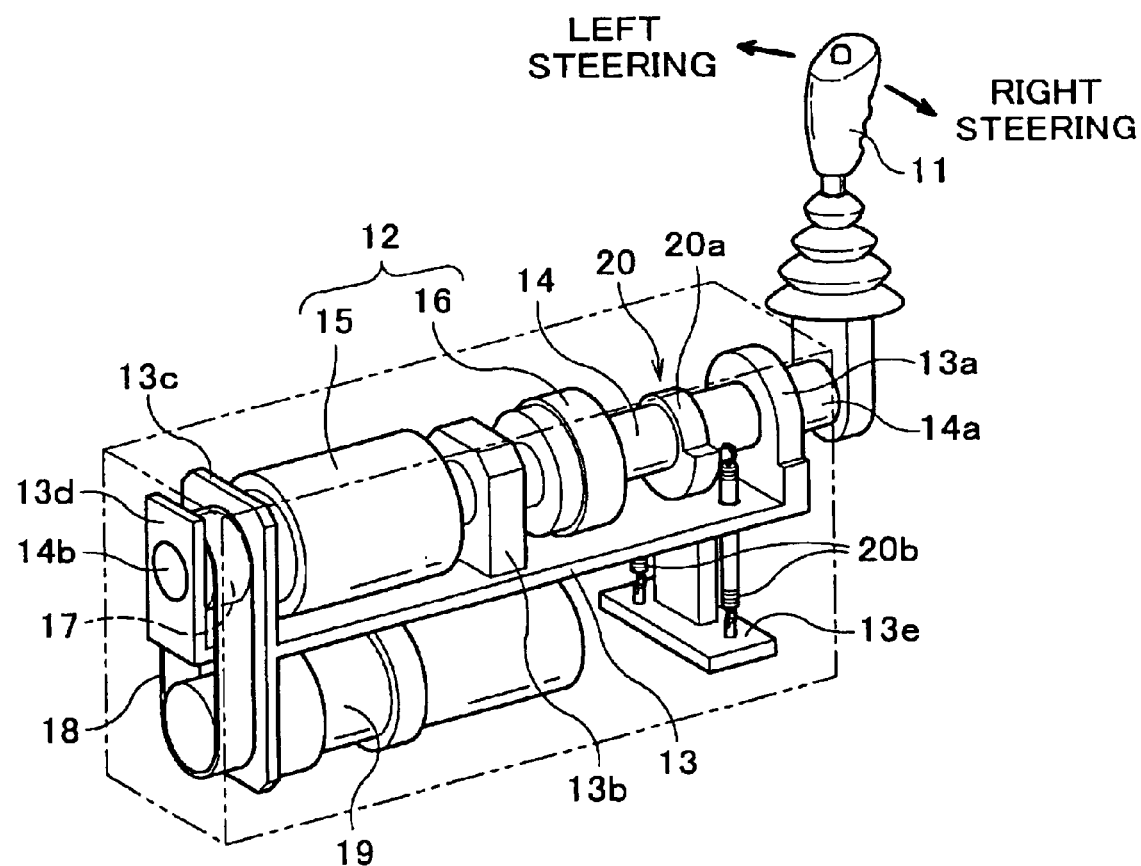
FIG. 2 is a perspective view showing the details of a controller.

As shown in FIG. 2, the controller 1 includes a lever 11 manipulated by a driver, a device 12 for detection of an amount of manipulation rendered to the lever 11 and a frame 13 for supporting the device 12.

A driver manipulates the lever 11 gripping its top with his hand. An end portion 14a of a rod 14 is fixed to the lower part of lever 11. The rod 14 is fixed perpendicular to the lever 11 and supported by bearings and the like at wall portions 13a, 13b, 13c and 13d of the frame 13. It will allow such a manipulation that the lever 11 can be tilted right or left about the rod 14 as an axis. Hereinafter, descriptions will be made introducing a concise expression of right steering, which represents a manipulation of tilting the lever 11 right about the rod 14 so as to steer the steerable wheels W right and also left steering representing a similar reverse manipulation.

A manipulation torque sensor 15 and a manipulation amount sensor 16, which are included in the device 12, are disposed in the longitudinal direction of rod 14.

Figure 3:
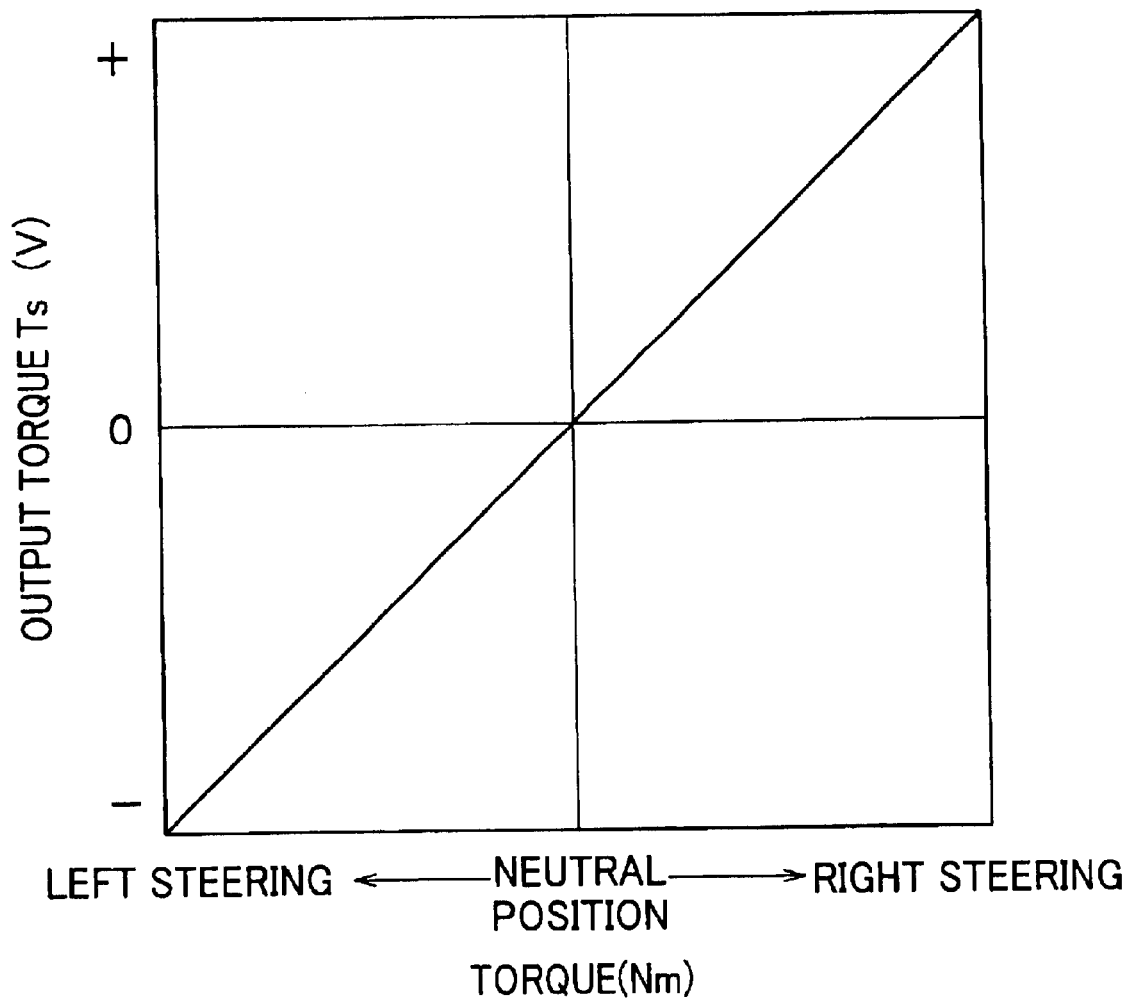
FIG. 3 is a graph showing the output characteristics of a manipulation torque sensor.

The manipulation torque sensor 15, which is composed of a sensor using a strain gauge and the like, improves the response at a start of manipulation of the lever 11 or at changing a steering direction of steerable wheels W by detecting the torque acting on the lever 11. The manipulation torque sensor 15 of the present embodiment generates an analogue signal of 0.1–4.9 V. A central processing unit (CPU) in a control unit 4 receives a digital signal converted from the analogue signal. A predetermined offset is given to the digital signal so that an analogue output of 2.5 V can be a null point. In this way, the control unit 4 assigns a positive sign to an output torque Ts detected by the manipulation torque sensor 15 when the lever 11 is tilted from a neutral position to the right for a right steering. When the lever 11 is manipulated reversely, the control unit 4 assigns a negative sign. The control unit 4 thus identifies a positive or negative sign of the output signal of manipulation torque sensor 15 as shown in FIG. 3. The output torque Ts delivered by manipulation torque sensor 15 is used for feed-forward (FF) control to be described later.

Figure 4:
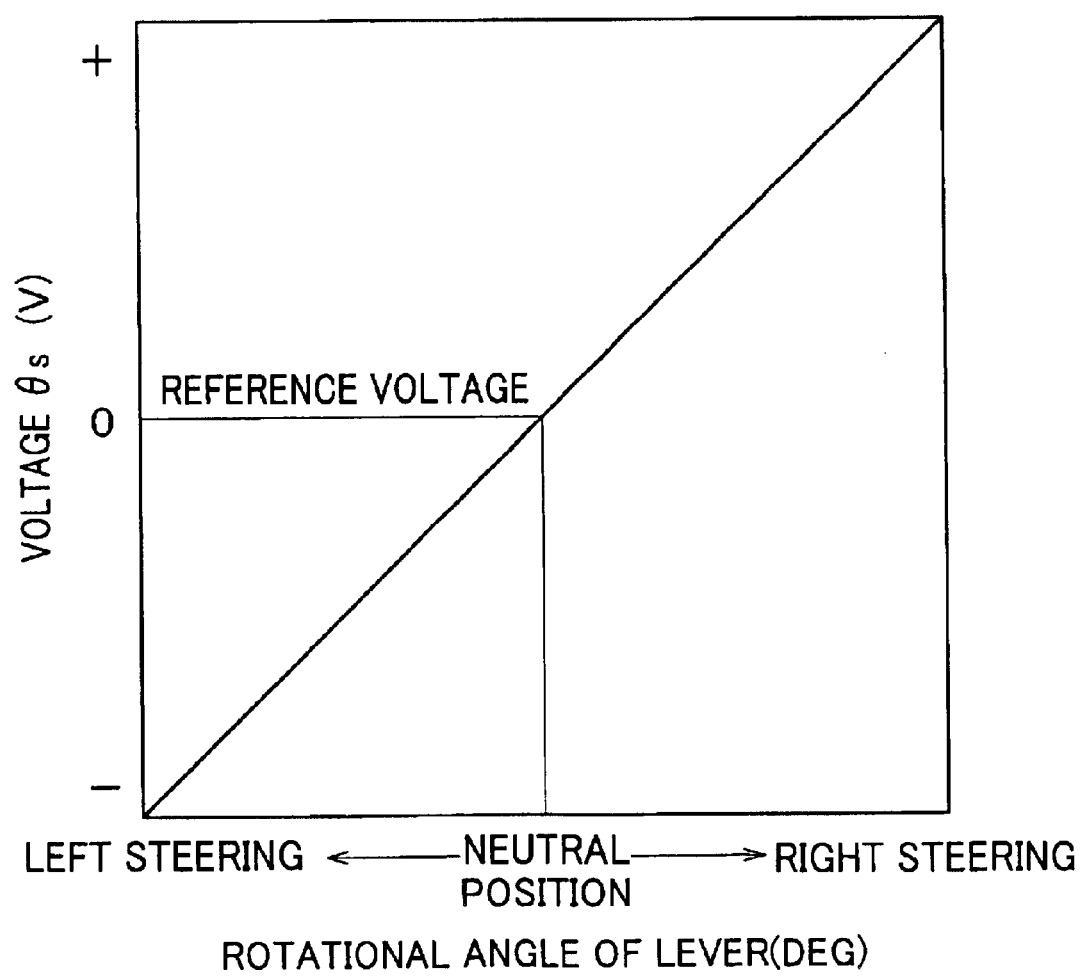
FIG. 4 is a graph showing the output characteristics of a manipulation amount sensor.

The manipulation amount sensor 16 includes a potentiometer for detecting a rotational angle of the rod 14 as a result of manipulation of the lever 11. The manipulation amount sensor 16 gives an amount of manipulation of the lever 11 in the form of a voltage θs. The CPU in the control unit 4 assigns a positive or negative sign to an output signal of the manipulation amount sensor 16 in the same manner as that of the manipulation torque sensor 15. As shown in FIG. 4, a reference voltage at which the lever 11 is in a neutral position is defined as a null point. When a torque is applied to the lever 11 for a right steering, the voltage θs increases. On the other hand when a torque is applied reversely to the lever 11 for a left steering, the voltage θs decreases. A signal of voltage θs delivered by the manipulation amount sensor 16 is sent to the control unit 4, which determines an amount of steering of the steerable wheels W.

The other end portion 14b of the rod 14 has a pulley 17, which is coupled to the rotational shaft of reaction force motor 19 with a belt 18.

The reaction force motor 19 receives a signal from the control unit 4. Collaborating with a centering mechanism 20, the reaction force motor 19 generates a reaction force of predetermined magnitude acting in the reverse direction relative to manipulation of the lever 11, according to an amount of manipulation and a manipulation torque of the lever 11, thereby improving the performance of manipulation associated with steering.

The centering mechanism 20, which assists the lever 11 to return to a neutral position, is provided between the lever 11 and the manipulation amount sensor 16. The centering mechanism 20 includes a plate 20a fixed to the rod 14 and centering springs 20b, the hooks of which are hooked on both right and left edges of the plate 20a. And the lower hooks of centering springs 20b are hooked on a bottom portion 13e of the frame 13. When a left steering is performed, a centering spring 20b lying in front in FIG. 2 generates a contractive reaction force as a result of expansion, thereby urging the lever 11 to return to the neutral position. When the lever 11 is tilted back to the neutral position subsequent to a left steering, the reaction force generated by the centering spring 20b assists the lever 11 to return.

Figure 5:
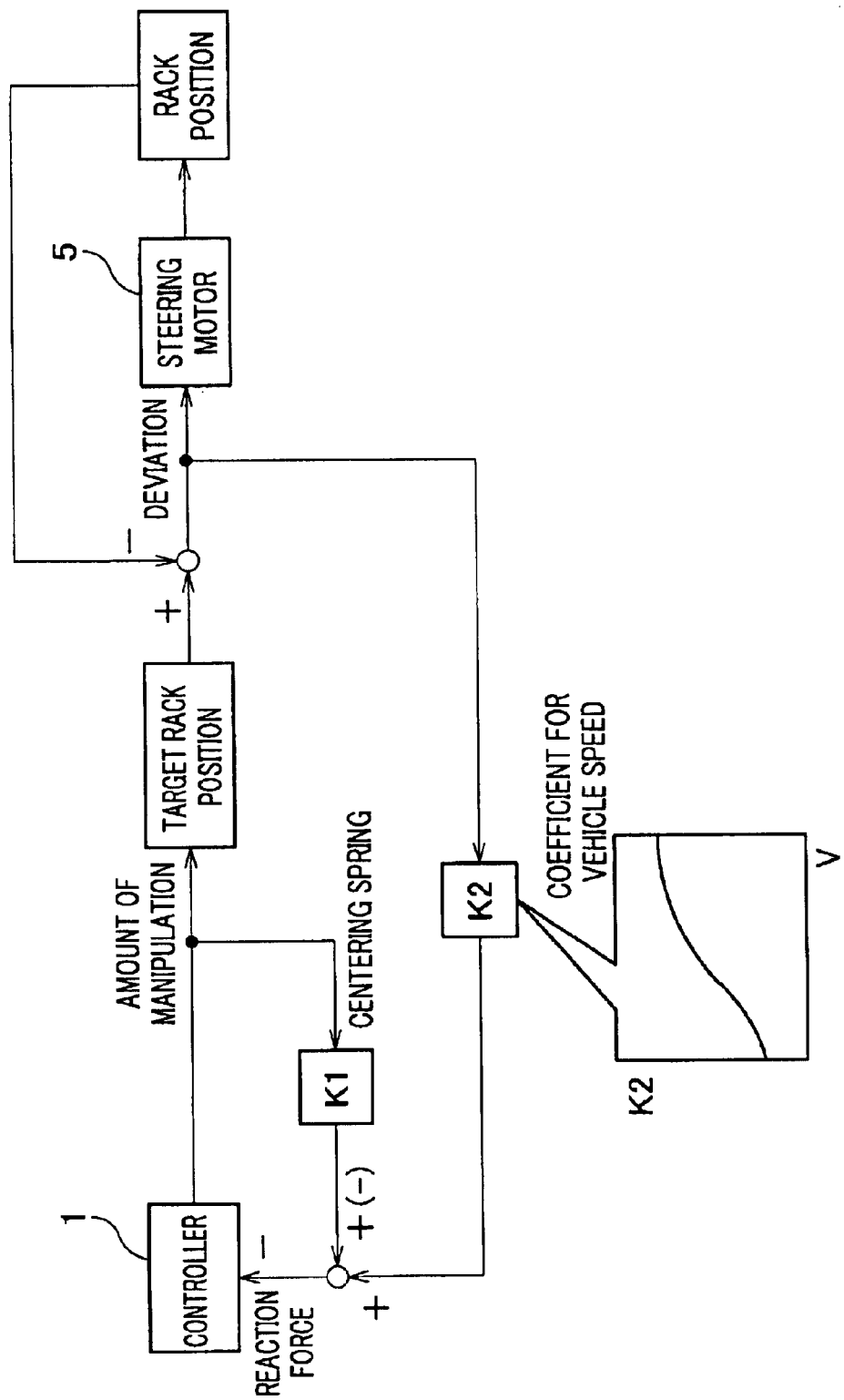
FIG. 5 is a block diagram showing a summary of control performed by a steering apparatus for a vehicle according to a first embodiment.
Figure 6:
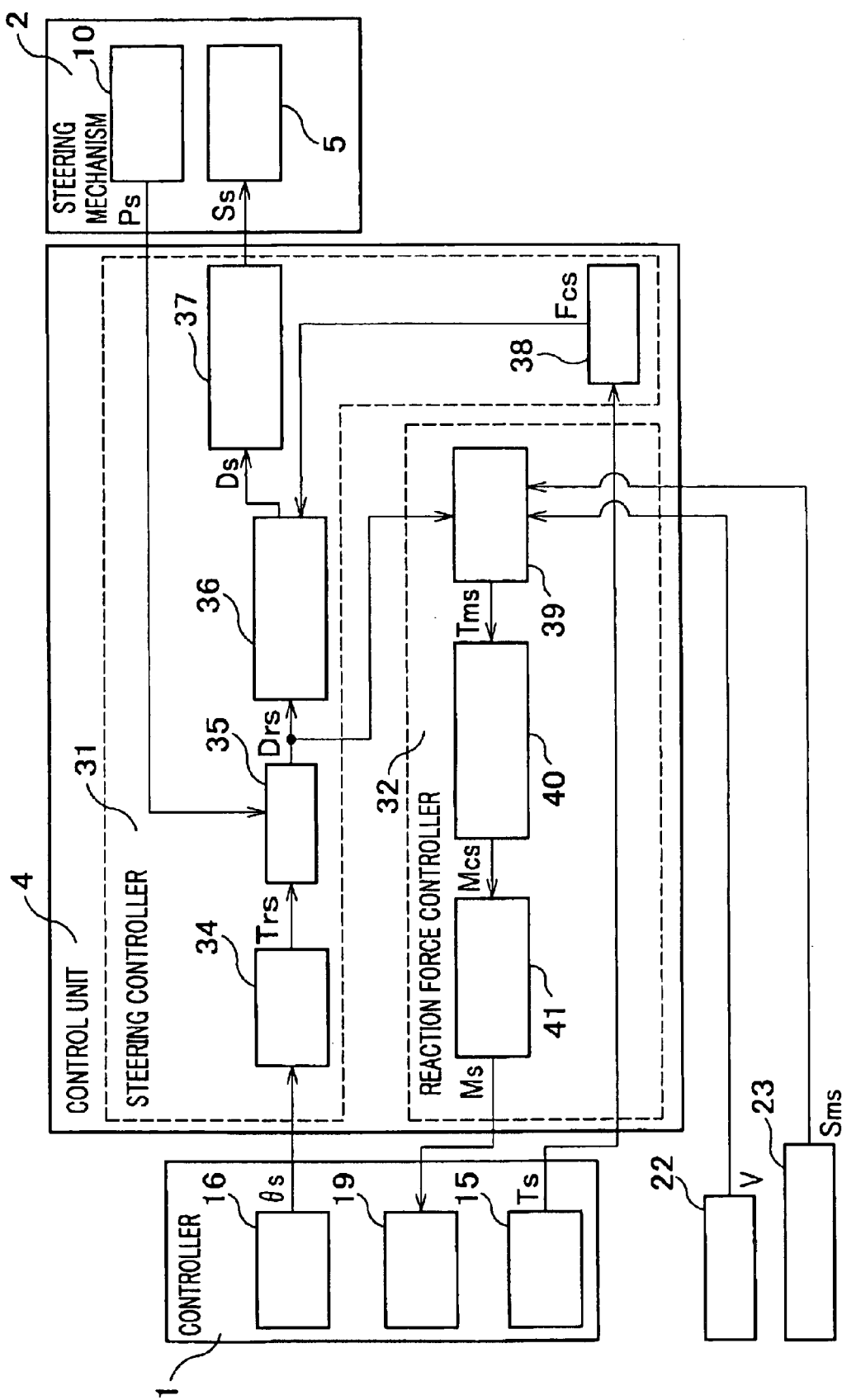
FIG. 6 is a block diagram showing a control unit.

The control unit 4 is described referring to FIGS. 5 and 6. FIG. 5 is a block diagram showing a summary of control performed by a steering apparatus according to the present embodiment. FIG. 6 is a block diagram showing a control unit.

As shown in FIG. 5, the control unit 4 applies a reaction force according to a spring constant K1 and the other reaction force generated by the centering spring 20b to the controller 1.

Manipulation of the lever 11 followed by expansion of the centering spring 20b results in a reaction force acting on the lever 11 so as to return the lever 11 to the neutral position. The reaction force acting on the lever 11 is produced by multiplying an amount of manipulation by the spring constant K1 of centering spring 20b. A target rack position is determined based on an amount of manipulation of lever 11. For example, this target rack position can be computed according to a value proportional to an amount of manipulation of lever 11. Then the control unit 4 computes a deviation between actual and target positions of the rack. The control unit 4 multiplies the deviation by a coefficient K2 for vehicle speed shown in FIG. 8, which becomes larger as the speed of a vehicle increases, thereby determining a reaction force and applying the reaction force to the controller 1.

An example of control unit 4 executing control described above is explained in detail.

The control unit 4 includes a central processing unit (CPU), a read only memory (ROM), a random access memory (RAM) and an electrical control unit (ECU) having electrical circuits. And as shown in FIG. 6, the control unit 4 is electrically connected to both controller 1 and steering mechanism 2 via harnesses for communication of signals.

The control unit 4 includes a steering controller 31, which receives output signals detected by the manipulation torque sensor 15 and manipulation amount sensor 16 and drives the steering motor 5 in the steering mechanism 2. The control unit 4 also includes a reaction force controller 32 for controlling the reaction force motor 19 in the controller 1.

The steering controller 31 includes a block 34 for target rack position, a block 35 for deviation computation, a block 36 for control signal of steering motor and a motor drive circuit 37.

The block 34, which determines a target rack position by map retrieval addressing a voltage θs detected by the manipulation amount sensor 16, delivers a signal Trs for target rack position.

The block 35 computes a deviation between a signal Trs for target rack position and a signal Ps for current rack position measured by the rack position sensor 10. And the block 35 judges that a direction of steering is rightward if the deviation is positive or leftward if it is negative, thereby delivering a deviation signal Drs with appropriate polarity and magnitude.

The block 36 performs P (Proportional), I (Integral) and D (Differential) processing for a deviation signal Drs to compute a control signal Cs, composing the control signal Cs with a control signal Fcs to be described later. Furthermore, the block 36 delivers an output signal Ds (direction signal+PWM signal), which is correlated with the polarity and absolute value of the composed product, to the motor drive circuit 37. In this connection, the block 36, which has the PID function described above, improves the tracking performance for the movement of rack shaft 7 with regard to a target rack position.

The motor drive circuit 37 generates an output signal Ss for driving the steering motor 5 according to the output signal Ds.

The steering controller 31 has a block 38 for FF control to improve the initial steering response. The block 38 performs FF control, which delivers a control signal Fcs to the block 36 according to an output torque Ts detected by the manipulation torque sensor 15.

In this way, it is possible to improve the steering response for such a case as an initial manipulation where an amount of manipulation of the lever 11 is not large but the torque applied to the lever 11 is large. FF control performed in the block 38 makes it possible to move the rack shaft 7 in advance anticipating the following increase in an amount of manipulation of the lever 11. A control signal Fcs is determined using the map of output torque Ts and an amount of driving of steering motor 5 prepared in the block 38.

The reaction force controller 32 includes a block 39 for target reaction force, a block 40 for control signal of reaction motor and a drive circuit 41 for reaction force motor. The block 39 determines a target reaction force to be applied to the lever 11 based on a vehicle speed V delivered by the speed sensor 22 and a deviation signal Drs delivered by the block 35 for deviation computation. The block 40, which receives a signal Tms for target reaction force delivered by the block 39, generates a control signal Mcs for driving the reaction force motor 19. And the drive circuit 41 has electrical circuits for driving the reaction force motor 19 according to the control signal Mcs.

Figure 7:
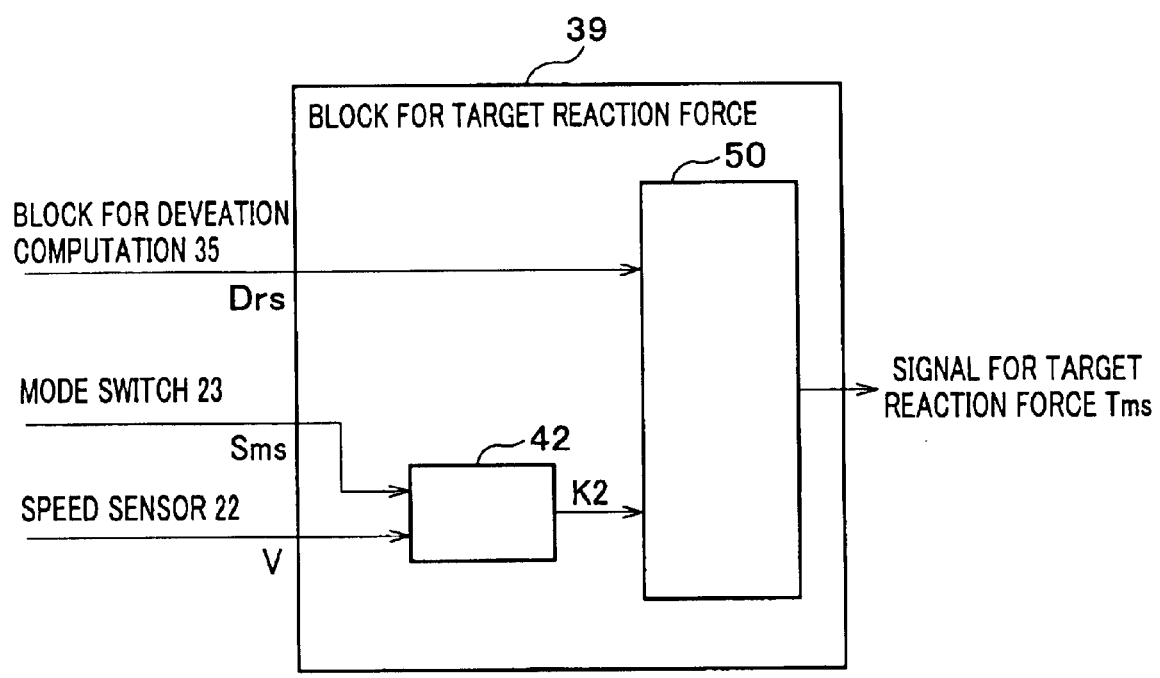
FIG. 7 is a block diagram showing a block for target reaction force according to the first embodiment.

As shown in FIG. 7, the block 39 has a sub-block 42 for vehicle speed coefficient, which delivers a gain, namely a coefficient K2 for vehicle speed, correlated with a vehicle speed V delivered by the speed sensor 22, and a multiplier 50 which delivers a signal Tms for target reaction force multiplying a deviation signal Drs by a coefficient K2.

Figure 8:
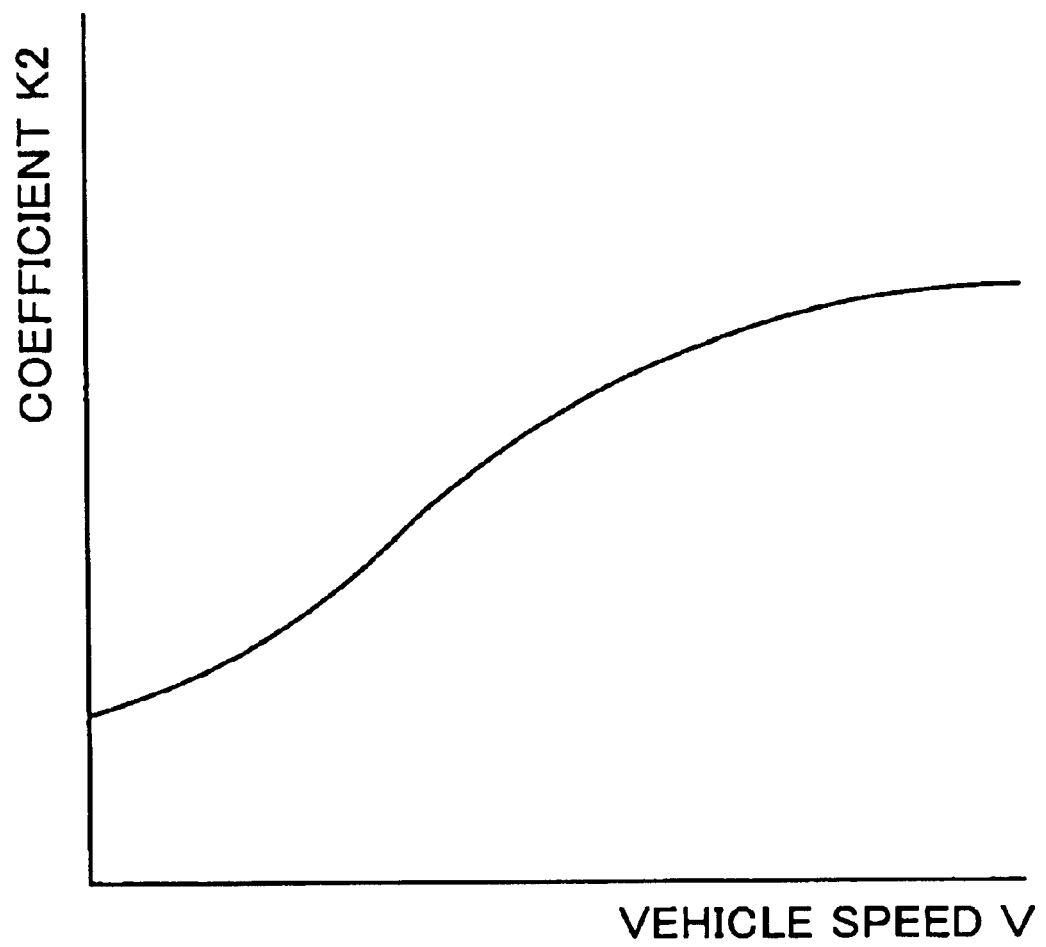
FIG. 8 is a map showing a coefficient K2 for vehicle speed.

The sub-block 42 determines a gain for a target reaction force using a map shown in FIG. 8, which defines a coefficient K2 as a function of vehicle speed V. The coefficient K2 becomes larger as the vehicle speed V increases. The sub-block 42 determines a coefficient K2 by map retrieval addressing a vehicle speed V, delivering the coefficient K2 to the block 39 for target reaction force.

It is preferable to provide a driver with choice for a coefficient K2. As shown in FIG. 6, an example with a mode switch 23 installed near the controller 1, which allows a driver to select one of sporty mode, normal mode and luxurious mode, is now described.

Figure 9:
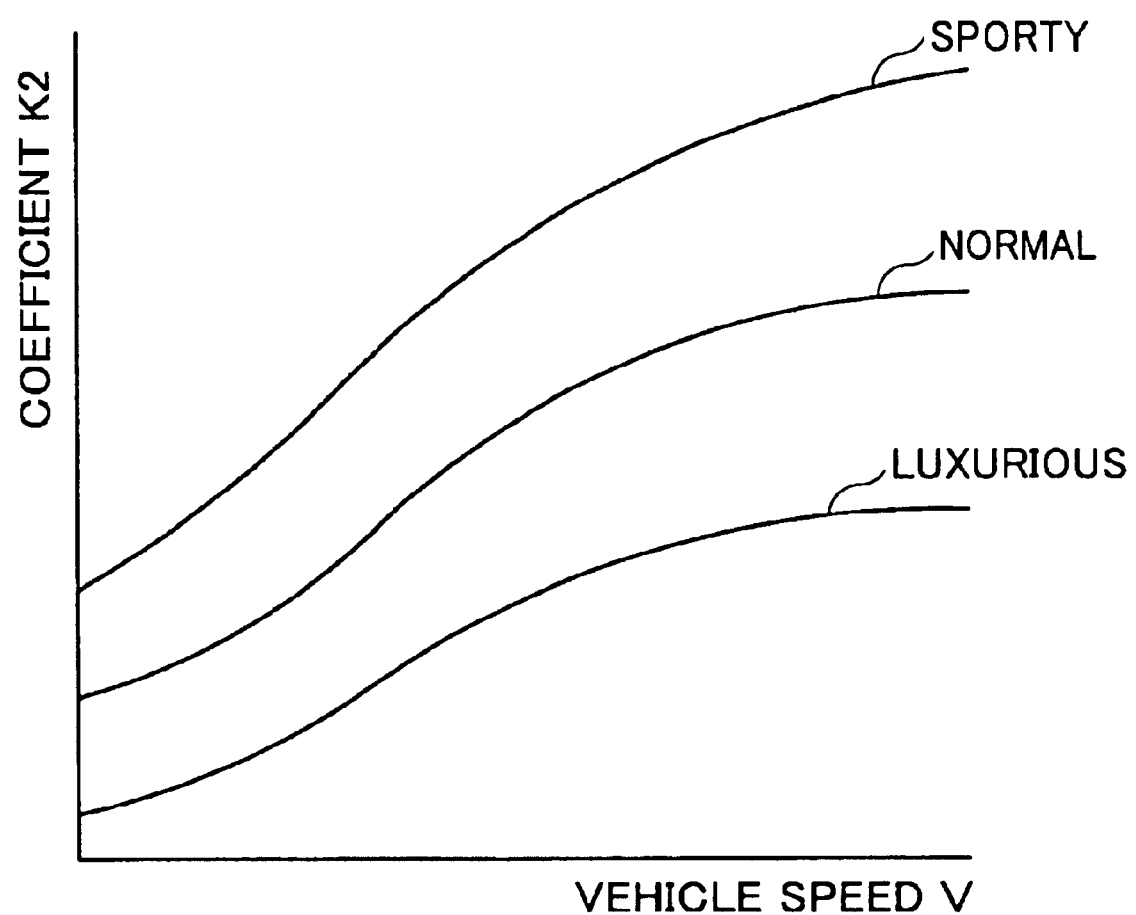
FIG. 9 is a map showing coefficients K2 for three vehicle modes.

The block 39 for target reaction force receives an output signal Sms delivered by the mode switch 23. As shown in FIG. 7, in the block 39, the output signal Sms containing information on a mode selected by a driver enters the sub-block 42 for vehicle speed coefficient. The sub-block 42 then selects a pattern of coefficient K2 out of plural patterns according to the output signal Sms. FIG. 9 illustrates an example of patterns. If normal mode is selected, a normal reaction force is applied to the lever 11 by using a K2 prepared for normal mode. On the other hand, if sporty mode is selected, a larger reaction force relative to that for the normal mode is applied by using a K2 prepared for sporty mode. Furthermore, if luxurious mode is selected, a smaller reaction force relative to that for normal mode is applied by using a K2 prepared for luxurious mode.

The sub-block 42 then determines a coefficient K2 according to a vehicle speed V, delivering the coefficient K2 to the block 39 for target reaction force. Provision of the plural patterns of coefficient K2 makes it possible to provide a driver with more direct manipulation feeling as a result of applying a relatively larger reaction force to the lever 11 in sporty mode. On the other hand, a driver is given soft and luxurious manipulation feeling in luxurious mode, since a relatively smaller reaction force is applied to the lever 11.

Figure 10:
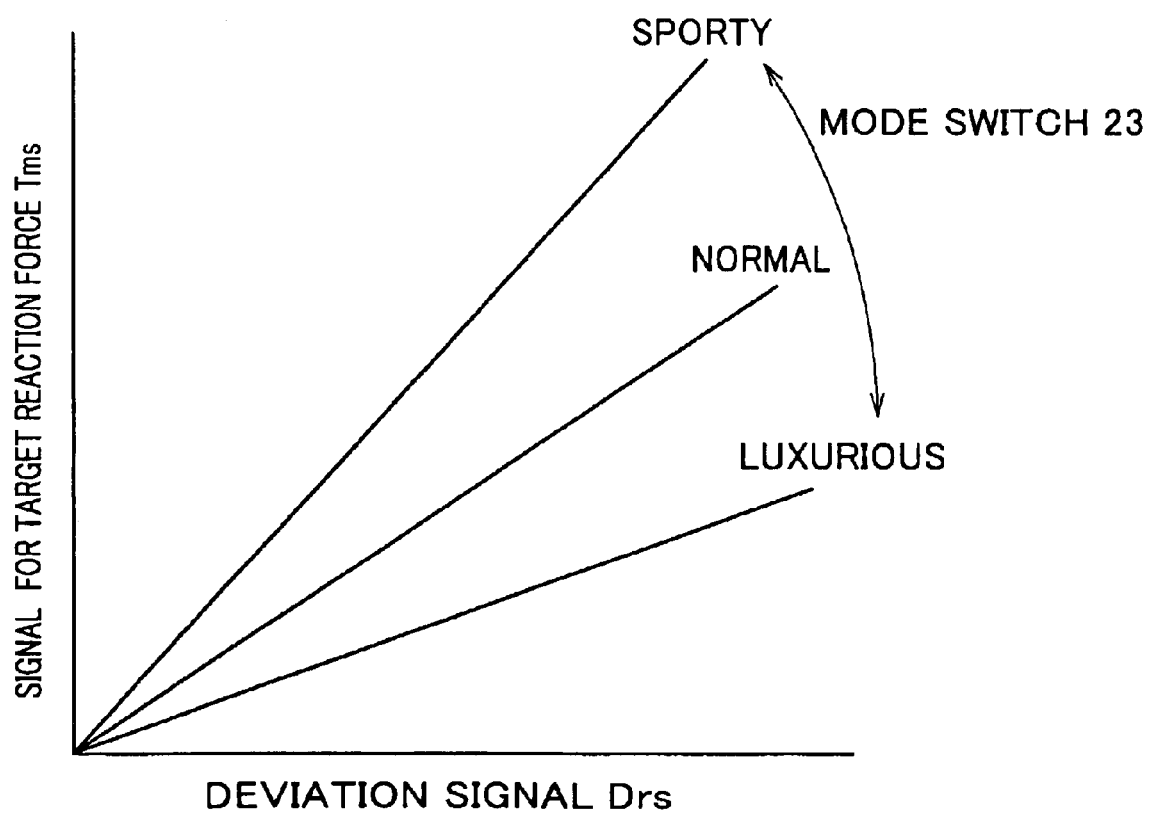
FIG. 10 is a graph showing the relationship between a deviation signal and a signal for target reaction force for three vehicle modes.

When the selection of mode is introduced, the relationship between a signal Tms for target reaction force and a deviation signal Drs is like that shown in FIG. 10. Since a signal Tms is computed by multiplying a deviation signal Drs by a coefficient K2 retrieved from the map shown in FIG. 9 addressing a vehicle speed V, the signal Tms will be larger proportionally as the deviation signal Drs increases. As sporty mode uses a larger K2 than that of normal mode over the whole range of vehicle speed V, the signal Tms of the former is generally larger than that of the latter. Similarly, the signal Tms of luxurious mode is generally smaller than that of normal mode.

Steering of a vehicle, on which such a steering apparatus is mounted, is now described referring to FIGS. 1, 6 and 7.

Description is made for a case where a driver manipulates a lever 11 rightward from a neutral position while a vehicle is traveling at a low speed approaching an intersection. At an initial stage of manipulation, a torque applied to the lever 11 by the driver is large, though an amount of manipulation of the lever 11 is small. A block 38 for FF control in a steering controller 31 determines a control signal Fcs to be sent to a block 36 for control signal of steering motor by retrieval of a torque map (not shown) addressing an output torque Ts, which a manipulation torque sensor 15 delivers. A rack shaft 7 starts a linear movement rightward according to the control signal Fcs in advance anticipating the subsequent substantial manipulation of the lever 11.

A block 34 for target rack position determines a target rack position according to an amount of manipulation of the lever 11 and a block 35 for deviation computation determines a deviation between the target rack position and a current rack position. A sub-block 42 for vehicle speed coefficient in a block 39 for target reaction force determines a coefficient K2 according to a current vehicle speed V, delivering the coefficient K2 to a multiplier 50 (see FIG. 7). Since the vehicle is traveling at a low speed, the sub-block 42 determines a relatively smaller coefficient K2. The multiplier 50 (block 39) computes an output signal Tms for target reaction force by multiplying a deviation signal Drs by a coefficient K2 for vehicle speed, delivering the output signal Tms to a block 40 for control signal of reaction motor.

Furthermore, the block 40 delivers a control signal Mcs, which is produced according to the output signal Tms, to a drive circuit 41 for reaction force motor. The drive circuit 41 delivers a drive signal Ms, thereby driving a reaction force motor 19.

In this way, since the reaction force applied to the lever 11 is relatively smaller, the driver can manipulate the lever 11 smoothly.

Description is next made for a case where a driver manipulates the lever 11 rightward from the neutral position so as to change a lane while a vehicle is cruising on an express way. At an initial stage of manipulation, a torque applied to the lever 11 by the driver is large, though an amount of manipulation of the lever 11 is small. The block 38 for FF control in the steering controller 31 determines a control signal Fcs to be sent to the block 36 for control signal of steering motor by retrieval of a torque map (not shown) addressing an output torque Ts, which the manipulation torque sensor 15 delivers. The rack shaft 7 starts a linear movement rightward according to the control signal Fcs in advance anticipating the subsequent substantial manipulation of the lever 11.

The block 34 for target rack position determines a target rack position according to an amount of manipulation of the lever 11 and the block 35 for deviation computation determines a deviation between the target rack position and a current rack position. The sub-block 42 for vehicle speed coefficient determines a coefficient K2 for vehicle speed according to a current vehicle speed V, delivering the coefficient K2 to the multiplier 50. Since a vehicle is traveling at a high speed, the sub-block 42 determines a relatively larger value of coefficient K2. The multiplier 50 (block 39) computes an output signal Tms for target reaction force by multiplying a deviation signal Drs by a coefficient K2 for vehicle speed, delivering the output signal Tms to the block 40 for control signal of reaction motor.

Furthermore, the block 40 delivers a control signal Mcs, which is produced according to the output signal Tms, to a drive circuit 41 for reaction force motor. The drive circuit 41 delivers a drive signal Ms, thereby driving the reaction force motor 19.

In this way, since the reaction force applied to the lever 11 is relatively larger, it can prevent the driver from doing a sudden manipulation of the lever 11, which leads to improvement of vehicle stability.

The steering apparatus for a vehicle according to the present embodiment allows both smooth manipulation feeling during vehicular travel at low speeds and improvement of vehicle stability during vehicular travel at high speeds.

When a driver selects a mode with a mode switch 23 installed near a controller 1, a coefficient K2 for vehicle speed correlated with the mode is retrieved. Then a reaction force is computed by multiplying a deviation by the coefficient K2. In this way, it is possible to select a reaction force satisfying the preference of driver.

b. Second Embodiment

Description is made for a second embodiment of the present invention. Priority is given to the items which differ from those described in the first embodiment and description is omitted for the items which are the same as those of the first embodiment bearing the same symbols.

Figure 11:
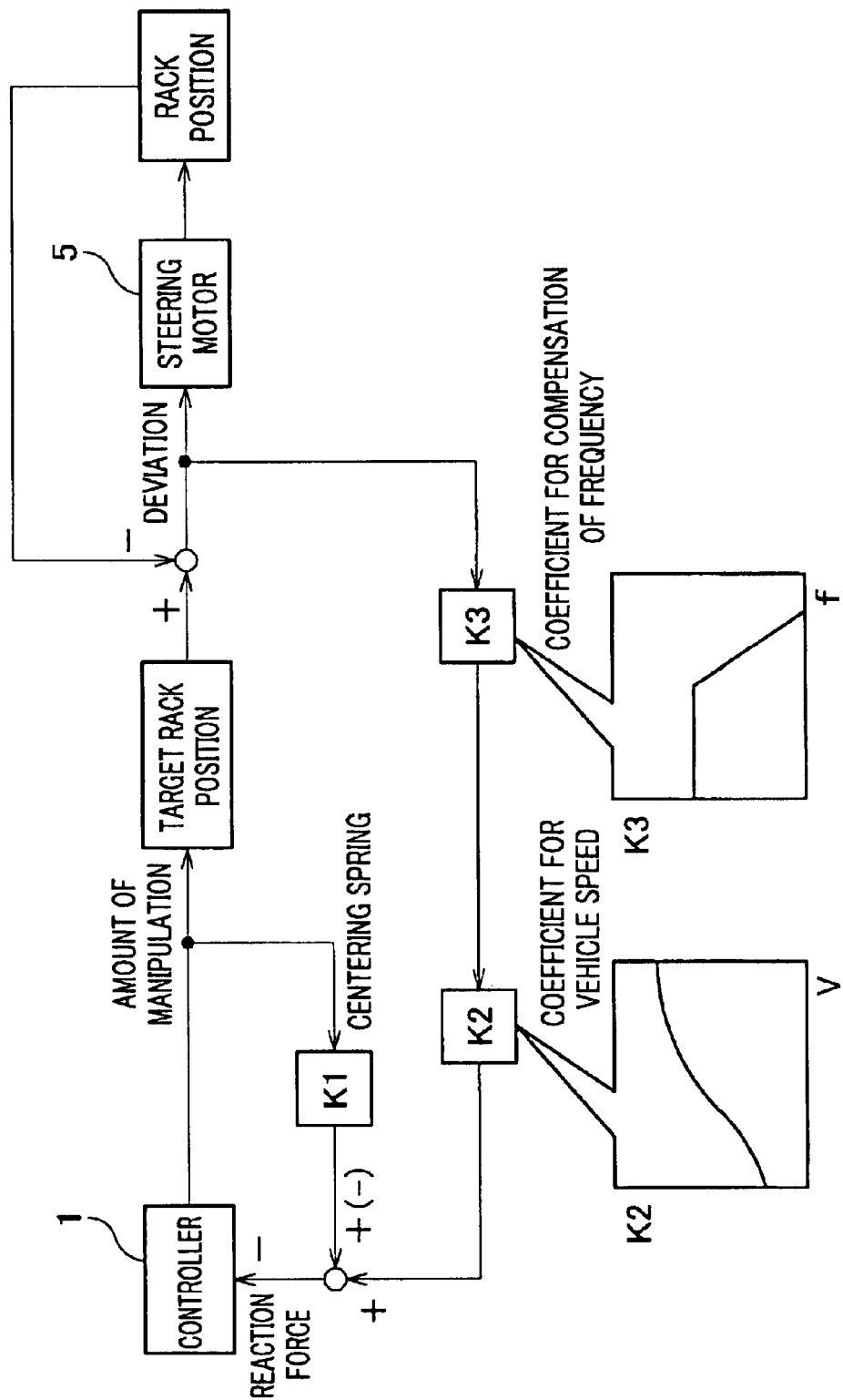
FIG. 11 is a block diagram showing a summary of control performed by a vehicle steering apparatus according to a second embodiment.
Figure 13:
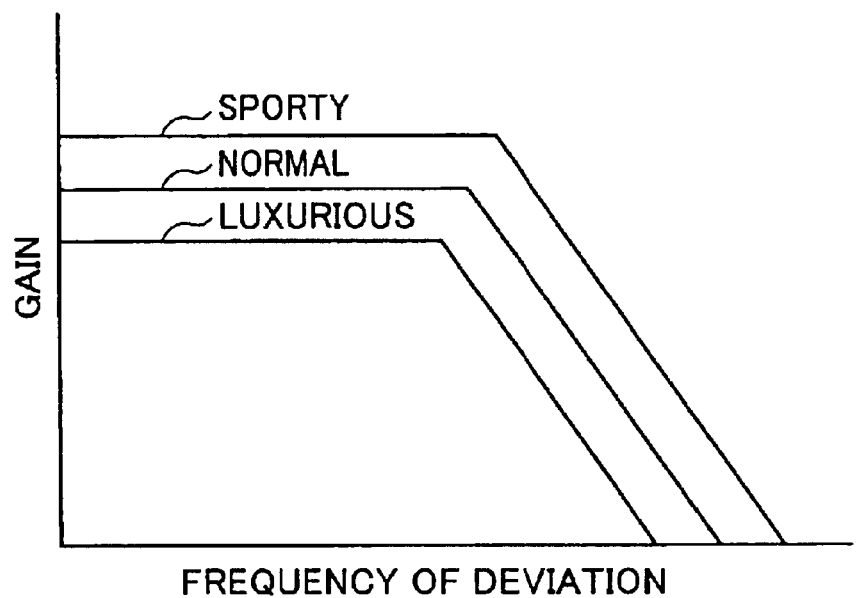
FIG. 13 is a graph showing the relationship between a frequency of deviation and a gain for three vehicle modes.

As shown in FIG. 11, a control unit 4 of the present embodiment applies the following reaction forces to a controller 1: a reaction force correlated with a spring constant K1 urged by a centering spring 20b and the other reaction force correlated with both a coefficient K2 for vehicle speed and a coefficient K3 for compensation of frequency. The coefficient K3 makes weighting for deviation signals Drs depending on frequencies thereof so that useful information such as the conditions of a road surface is selectively conveyed to a driver in the form of reaction force. For example as shown in FIG. 13, when the frequency of a deviation is high, a small gain is selected as a result of weighting.

A block 39 for target reaction force in the control unit 4 of the present embodiment has an additional sub-block 43 for compensation of frequency, which delivers a coefficient K3 to a multiplier 50, compared with the arrangement of the first embodiment.

The sub-block 43 selects a pattern out of plural patterns of gain according to an output signal Sms delivered by a mode switch 23. For example as shown in FIG. 13, if sporty mode is selected, the sub-block 43 determines a generally larger gain than that of normal mode and also employs a higher frequency at which the sub-block 43 delivers a gain of zero. On the other hand, if luxurious mode is selected, the sub-block 43 determines a generally smaller gain than that of normal mode and also employs a lower frequency at which the sub-block 43 delivers a gain of zero.

In this connection, it may be possible to adopt an alternative which does not employ a mode switch 23 if a single-mode approach is selected.

The multiplier 50 multiplies a deviation signal Drs by a coefficient K3 delivered by the sub-block 43. Since a frequency of deviation Drs is multiplied by a gain shown in FIG. 13, the coefficient K3 serves as a filter cutting higher frequencies. The multiplier 50 then multiplies a product of the deviation signal Drs and coefficient K3 by a coefficient K2 delivered by a sub-block 42 for vehicle speed, thereby producing an output signal Tms for target reaction force. Subsequently, the multiplier 50 delivers the output signal Tms to a block 40 for control signal of reaction motor.

Figure 12:
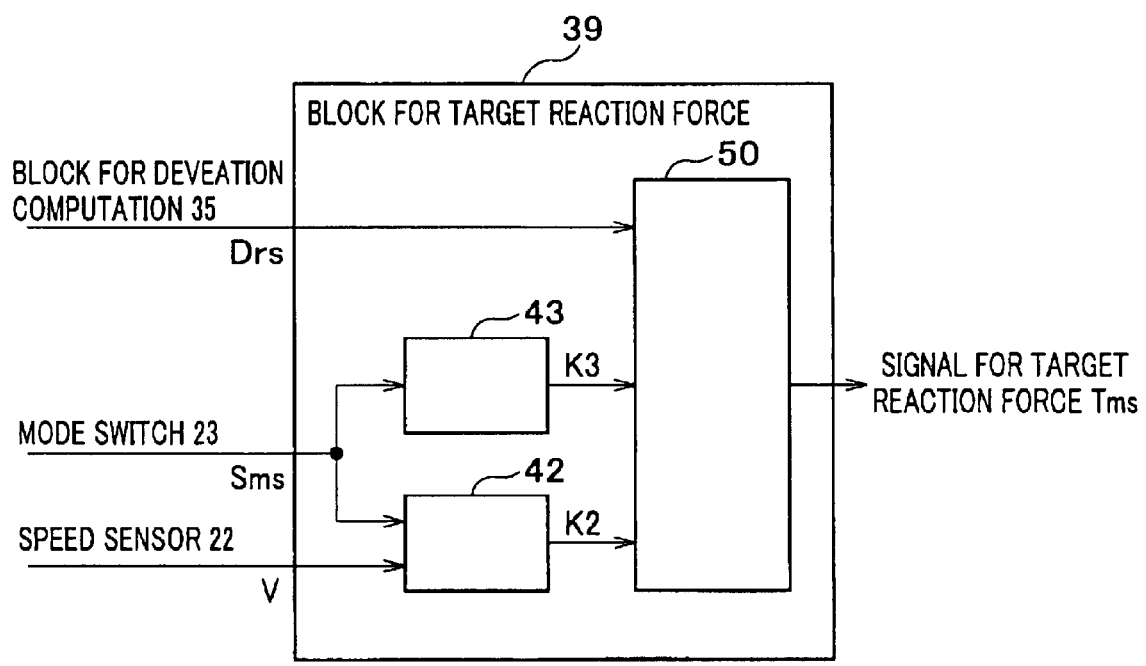
FIG. 12 is a block diagram showing a block for target reaction force according to the second embodiment.

Steering of a vehicle, on which such a steering apparatus is mounted, is described referring to FIGS. 11 and 12.

When a driver manipulates a lever 11 rightward from a neutral position, a block 38 for FF control starts moving a rack shaft 7 rightward in advance anticipating a subsequent substantial manipulation of the lever 11, in the same manner as that of the first embodiment.

A block 34 for target rack position determines a target rack position according to an amount of manipulation of the lever 11 and a block 35 for deviation computation computes a deviation between the target rack position and a current rack position. While, a sub-block 42 for vehicle speed coefficient determines a coefficient K2 according to a current vehicle speed V, delivering the coefficient K2 to a multiplier 50. Also a sub-block 43 for compensation of frequency determines a coefficient K3 according to an output signal Sms delivered by a mode switch 23, delivering the coefficient K3 to the multiplier 50. The multiplier 50 (a block 39 for target reaction force) computes an output signal Tms for target reaction force by multiplying the deviation by the coefficient K3 and then the coefficient K2, delivering the output signal Tms to a block 40 for control signal of reaction motor.

Furthermore, the block 40 determines a control signal Mcs according to the output signal Tms, delivering the control signal Mcs to a motor drive circuit 41. The motor drive circuit 41 delivers a drive signal Ms, thereby driving a reaction force motor 19.

Since the steering apparatus for a vehicle of the present embodiment applies a reaction force to the lever 11, which is produced according to a deviation signal Drs after lowering the high frequency components thereof, the apparatus can prevent an uncomfortable vibration of high frequency from being conveyed to the lever 11 of controller 1. In this way, manipulation feeling is improved by cutting vibration of high frequency in addition to improvement of vehicle stability which is accomplished by applying a larger reaction force to the lever 11 as the speed of a vehicle increases.

Figure 14:
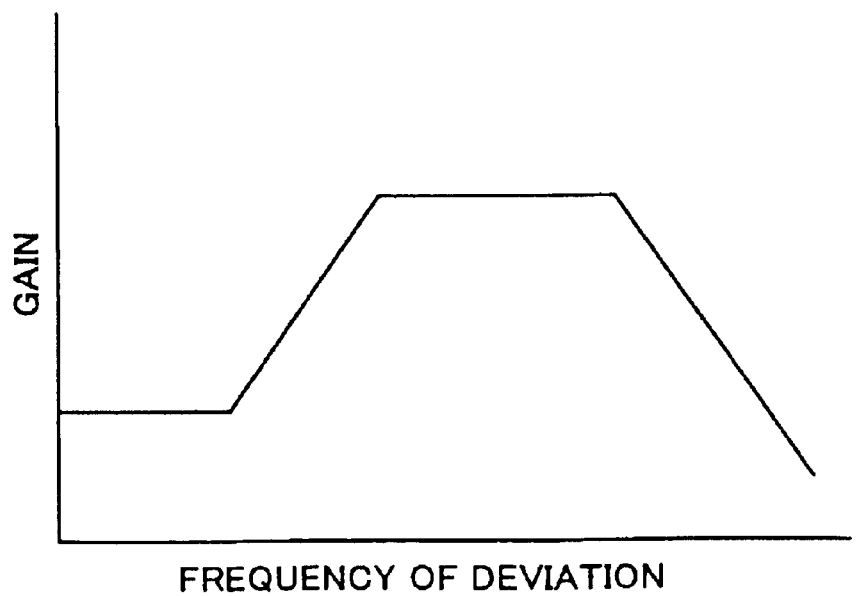
FIG. 14 is another example of a graph showing the relationship between a frequency of deviation and a gain.

Instead of a pattern of gain shown in FIG. 13 in which gains are decreased simply for high frequencies, another pattern shown in FIG. 14 may be preferable. The pattern in FIG. 14 has a feature that gains for medium frequencies are set to be larger than those for low frequencies. It is at the same time recommended that gains for higher frequencies be gradually decreased in the same manner as that of FIG. 13.

Introduction of such a pattern of gain for a coefficient K3 for compensation of frequency will achieve the following advantages. While a driver is manipulating a lever slowly, the apparatus applies a small reaction force. On the other hand, while the driver is making a sporty manipulation during vehicular travel on a winding road, the apparatus applies an appropriate reaction force and also prevents conveying uncomfortable vibration of high frequency.

It will now be appreciated from the foregoing description that the present invention is not limited to the particularly illustrated embodiments discussed above and may be carried out in various modified forms.

A conventional steering wheel may be selected instead of a lever 11 of joy stick type, based on which description has been made for a controller 1. Though the lever 11 is dedicated to steering, another operation associated with throttling and braking may also be assigned to the lever 11. A control unit 4 can be configured using software or hardware.

A target reaction force may be determined taking into account the status of lever 11 moving from a neutral point or going back thereto, the speed of manipulation of the lever 11 and the like. It may be possible to select a self-aligning system which returns steerable wheels W automatically to their neutral positions as a vehicle travels.

Furthermore, when a stepping motor is used for a steering motor 5, a block 35 for deviation computation, which is for feedback control of steerable wheels W, can be obviated since no feedback loop is required.

What is claimed is:

1. A steering apparatus for a vehicle comprising:

a controller which a driver manipulates for steering;

a first device for detection of an amount of manipulation rendered to the controller;

a second device for detection of an amount of steering of steerable wheel;

a control unit for controlling the amount of steeling based on at least the amount of manipulation detected by the first device; and a third device for applying a reaction force to the controller in a direction opposite to a direction of the manipulation according to a signal delivered by the control unit, wherein the steering apparatus further comprises a sensor for detection of a speed of the vehicle, and the control unit determines the reaction force by multiplying deviation between the amount of manipulation and the amount of steering by a coefficient for vehicle speed, which is adapted to be larger as the speed of the vehicle detected by the sensor increases.

2. The steering apparatus for a vehicle according to claim 1, further comprising;

a switch by which a driver can select a mode, wherein the control unit determines a reaction force by introducing a coefficient for vehicle speed correlated with the mode selected by the driver with the switch.

3. The steering apparatus for a vehicle according to claim 1, wherein the control unit determines a reaction force by multiplying the deviation by a coefficient for compensation of frequency, which is adapted to decrease in a high frequency range of the deviation.

4. The steering apparatus for a vehicle according to claim 3, wherein the coefficient for compensation of frequency is adapted to take larger values in a medium frequency range than in a low frequency range.

5. The steering apparatus for a vehicle according to claim 3, further comprising:

a switch by which a driver van select a mode, wherein the control unit determines a reaction force by introducing a coefficient for compensation of frequency correlated with the mode selected by the driver with the switch.

6. The steering apparatus for a vehicle according to claim 4, further comprising:

a switch by which a driver can select a mode, wherein the control unit determines a reaction force by introducing a coefficient for compensation of frequency correlated with the mode selected by the driver with the switch.

* * * * *